(12) United States Patent
Jang et al.

(10) Patent No.: US 9,435,988 B2
(45) Date of Patent: Sep. 6, 2016

(54) ZOOM LENS SYSTEM

(71) Applicant: HANWHA TECHWIN CO., LTD., Changwon-Si (KR)

(72) Inventors: Jin Ho Jang, Changwon-si (KR); Young Su Choi, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 135 days.

(21) Appl. No.: 14/547,298

(22) Filed: Nov. 19, 2014

(65) Prior Publication Data

US 2015/0338621 A1 Nov. 26, 2015

(30) Foreign Application Priority Data

May 26, 2014 (KR) .......................... 10-2014-0063116

(51) Int. Cl.
*G02B 15/177* (2006.01)
*G02B 15/16* (2006.01)

(52) U.S. Cl.
CPC ........... *G02B 15/177* (2013.01); *G02B 15/161* (2013.01)

(58) Field of Classification Search
CPC .. G02B 15/177; G02B 15/161; G02B 15/28; G02B 15/14
USPC .................................. 359/680–682, 690–691
See application file for complete search history.

(56) References Cited

U.S. PATENT DOCUMENTS

| 5,319,495 | A | 6/1994 | Yamada | |
|---|---|---|---|---|
| 7,046,454 | B2 | 5/2006 | Tomioka | |
| 7,589,910 | B2 | 9/2009 | Ohashi | |
| 8,724,232 | B2 | 5/2014 | Katsuragi | |
| 2012/0147480 | A1* | 6/2012 | Fujisaki | G02B 15/177 359/691 |
| 2015/0054988 | A1* | 2/2015 | Kimura | G02B 15/177 348/240.3 |
| 2015/0326792 | A1* | 11/2015 | Yamasaki | H04N 5/2253 348/240.3 |

FOREIGN PATENT DOCUMENTS

| JP | 05-119256 A | 5/1993 |
|---|---|---|
| JP | 2004-317901 A | 11/2004 |
| JP | 2008-033212 A | 2/2008 |
| KR | 10-2012-0046012 A | 5/2012 |

\* cited by examiner

*Primary Examiner* — Jordan Schwartz
(74) *Attorney, Agent, or Firm* — Sughrue Mion, PLLC

(57) ABSTRACT

A zoom lens system capable of satisfactorily compensating for aberration, including, in an order from an object to an image, a first lens group having a negative refractive power, an aperture, and a second lens group having a positive refractive power, wherein the first lens group including a first lens, a second lens, a third lens and a fourth lens in the order from the object to the image, and wherein an Abbe number of the first lens is less than 30, an Abbe number of the second lens is greater than 45 and less than 65, and a ratio of an Abbe number of the third lens to an Abbe number of the fourth lens is greater than 3.8 and less than 4.3.

12 Claims, 8 Drawing Sheets

ZOOM LENS SYSTEM

CROSS-REFERENCE TO RELATED APPLICATION

This application claims priority from Korean Patent Application No. 10-2014-0063116, filed on May 26, 2014, in the Korean Intellectual Property Office, the disclosure of which is incorporated herein by reference in its entirety.

BACKGROUND

1. Field

Apparatuses consistent with exemplary embodiments relate to a zoom lens system, and more particularly, to a zoom lens system which may satisfactorily compensate for aberration.

2. Description of the Related Art

With advancement in optics technology, the number of pixels per unit area of a digital photographing apparatus that captures an image by using a charge-coupled device (CCD) or a complementary metal-oxide semiconductor (CMOS) is continuously increased. Although the number of pixels per unit area increases, a lens system employed in a digital photographing apparatus is required to maintain high optical performance as well as a small size for convenience and portability.

In order to clearly record even small details of a subject, a lens system should satisfactorily compensate for aberration generated in a peripheral area of an image. However, it is difficult to miniaturize a lens system if high optical performance is to be realized, and manufacturing costs are increased to miniaturize such a lens system. Thus, it is difficult to simultaneously satisfy high optical performance and low manufacturing costs.

SUMMARY

However, such a zoom lens system of the related art has a problem in that the overall size of zoom lens systems is increased in order to satisfactorily compensate for aberration.

To provide a zoom lens system capable of satisfactorily compensating for aberration, which may solve many problems including the above-mentioned problem, is but only an example, and does not restrict the inventive concepts.

According to an aspect of an exemplary embodiment, there is provided a zoom lens system including, in an order from an object to an image, a first lens group having a negative refractive power, an aperture, and a second lens group having a positive refractive power, wherein the first lens group including a first lens, a second lens, a third lens and a fourth lens in the order from the object to the image, and wherein an Abbe number of the first lens is less than 30, an Abbe number of the second lens is greater than 45 and less than 65, and a ratio of an Abbe number of the third lens to an Abbe number of the fourth lens is greater than 3.8 and less than 4.3.

The zoom lens system is configured to perform zooming by moving the second lens group in an optical axis direction.

The zoom lens system is configured to perform focusing by moving the first lens group in an optical axis direction.

Each of the first, second and third lenses may have a negative refractive power, and the fourth lens may have a positive refractive power. The third and fourth lenses are cemented to each other.

The second lens group may include a fifth lens, a sixth lens, a seventh lens, an eighth lens, a ninth lens and a tenth lens in the order from the object to the image, and wherein an Abbe number of the fifth lens is greater than 63, and an Abbe number of the tenth lens is less than 25. At this time, the fifth lens, the sixth lens, the eighth lens, and the tenth lens may have positive refractive power, and the seventh lens and the ninth lens may have negative refractive power.

Furthermore, the fifth lens may have at least one aspheric surface.

The fifth lens may have two aspheric surfaces.

The tenth lens may have at least one aspheric surface.

The tenth lens may have two aspheric surfaces.

The tenth lens may have a meniscus shape.

According to an aspect of an exemplary embodiment, there is provided an image capturing system including: an image pickup device configured to capture an image; and the above described zoom lens system.

Additional aspects will be set forth in part in the description which follows and, in part, will be apparent from the description, or may be learned by practice of the exemplary embodiments.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
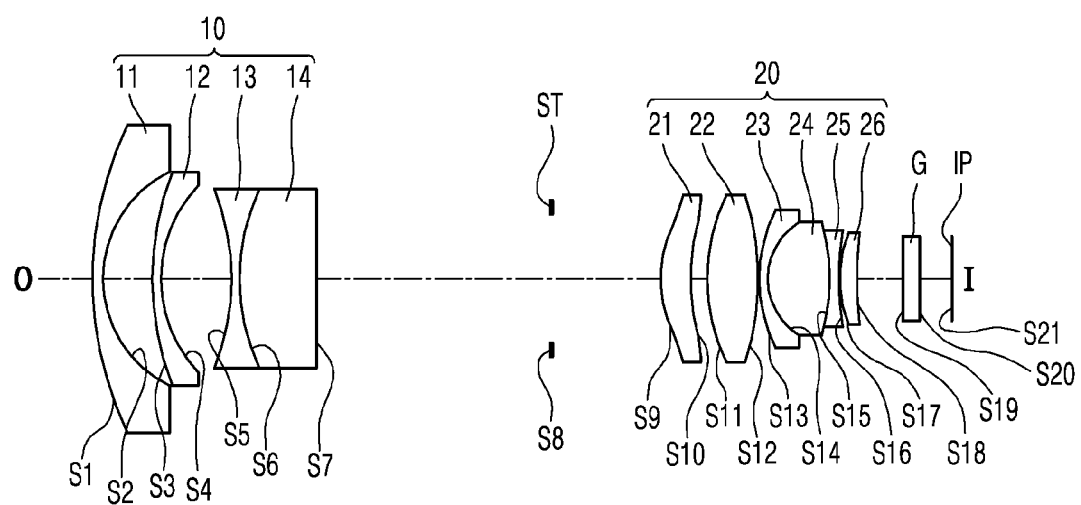
FIG. 1 is a schematic view of a zoom lens system in a wide angle mode according to an exemplary embodiment.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the present description.

Hereinafter, exemplary embodiments will be described in detail with reference to the attached drawings. The overlapping description is omitted, by referring to similar components.

Rather, the exemplary embodiments are provided so that this disclosure will be thorough and complete, and will fully convey the scope of the inventive concepts to one of ordinary skill in the art. Sizes of components in the drawings may be exaggerated for convenience of explanation. In other words, since sizes and thicknesses of components in the drawings are arbitrarily illustrated for convenience of explanation, the following exemplary embodiments are not limited thereto.

Figure 2:
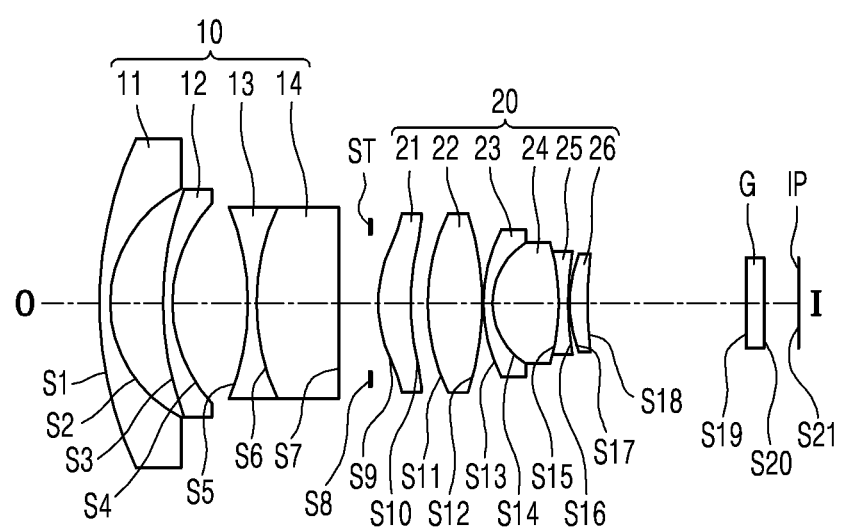
FIG. 2 is a schematic view of a zoom lens system in a telephoto mode according to an exemplary embodiment.

FIGS. 1 and 2 are schematic views of a zoom lens system according to an exemplary embodiment. FIG. 1 shows the zoom lens system in a wide angle mode, and FIG. 2 shows the zoom lens system in a telephoto mode according to the exemplary embodiment.

The zoom lens system according to the exemplary embodiment includes, in an order from an object O to an image I, a first lens group 10, an aperture ST, and a second lens group 20. An optical block G such as an optical filter or a faceplate, may be disposed between the second lens group 20 and an image plane IP.

Such a zoom lens system according to the exemplary embodiment, as shown in FIGS. 1 and 2, may be configured to perform zooming by moving the second lens group 20 in an optical axis direction. The first lens group 10 may be configured to be moved in the optical axis direction, and thus configured to perform focusing by compensating for image plane fluctuation due to a change in distance from the object O. Here, the first lens group 10 has a negative refractive power, and the second lens group 20 has a positive refractive power.

Specifically, the first lens group 10 includes a first lens 11, a second lens 12, a third lens 13 and a fourth lens 14 in an order from the object O to the image I, wherein an Abbe number of the first lens 11 is less than 30, an Abbe number of the second lens 12 is greater than 45 and less than 65, and a ratio of an Abbe number of the third lens 13 to an Abbe number of the fourth lens 14 is greater than 3.8 and less than 4.3. Furthermore, each of the first lens 11, the second lens 12 and the third lens 13 has a negative refractive power, the fourth lens 14 has a positive refractive power, and the third lens 13 and the fourth lens 14 are cemented to each other.

High power is needed in order to increase magnification of the first lens 11 and the second lens 12 having negative refractive powers in the first lens group 10, i.e., in order to increase a zoom ratio of the first lens 11 and the second lens 12. To this end, each of the first lens 11 and the second lens 12 needs to have a high refractive index. By doing so, the overall size of the zoom lens system may be miniaturized even though the zoom ratio is increased. Also, a difference between the Abbe number of the first lens 11 and the Abbe number of the second lens 12 in the first lens group 10 needs to be great in order to compensate for aberration while magnification of the first lens group 10 is increased. Thus, the Abbe number of the first lens 11 needs to be less than 30, and the Abbe number of the second lens 12 needs to be greater than 45 and less than 65, in order to compensate for aberration while magnification of the first lens 11 and the second lens 12 in the first lens group 10, is increased.

Meanwhile, when the Abbe numbers of the first lens 11 and the second lens 12 satisfy the conditions described above, aberration of a peripheral portion away from the center of the image plane by 0.5 or more field, may be satisfactorily compensated for, but aberration of a center portion within 0.5 field from the image plane center, needs to be compensated for by another method. In other words, the Abbe number of the third lens 13 and the Abbe number of the fourth lens 14 need to be controlled for compensation of the aberration of the center portion. To this end, the ratio of the Abbe number of the third lens 13 to the Abbe number of the fourth lens 14 needs to be greater than 3.8 and less than 4.3.

Since the third lens 13 and the fourth lens 14 are cemented together to form a cemented lens, compensation of the aberration of the center portion of the cemented lens may be performed by increasing the difference in refractive indexes of the third lens 13 and the fourth lens 14. Thus, the ratio of the Abbe number of the third lens 13 to the Abbe number of the fourth lens 14 needs to be greater than 3.8. Meanwhile, when the ratio of the Abbe number of the third lens 13 to the Abbe number of the fourth lens 14 is greater than 4.3, it can be seen that the aberration increases. As a result, the ratio of the Abbe number of the third lens 13 to the Abbe number of the fourth lens 14 needs to be within a range of 3.8 and 4.3.

The zoom lens system according to the exemplary embodiment described above may be miniaturized in its overall size, while compensation of the aberration is satisfactorily performed.

The second lens group 20 includes, in the order from the object O to the image I, a fifth lens 21, a sixth lens 22, a seventh lens 23, an eighth lens 24, a ninth lens 25 and a tenth lens 26. Each of the fifth lens 21, the sixth lens 22, the eighth lens 24, and the tenth lens 26 has a positive refractive power, and each of the seventh lens 23 and the ninth lens 25 has a negative refractive power. Here, an Abbe number of the fifth lens 21 may be greater than 63, and an Abbe number of the tenth lens 26 may be less than 25.

Such a configuration of the second lens group 20 may also contribute to miniaturization of the overall size while satisfactorily performing compensation of aberration in the zoom lens system. Especially, the fifth lens 21 may include at least one aspheric surface for satisfactorily performing compensation of aberration. The tenth lens 26 may include at least one aspheric surface while having a positive refractive power, in a meniscus shape. Thus, the second lens group 20 may satisfactorily compensate for coma that may be generated at the peripheral area.

The zoom lens system according to the exemplary embodiment described above satisfactorily compensates for aberration at the peripheral portion while maintaining miniaturization of the overall size. Furthermore, the zoom lens system effectively compensates for chromatic aberration from a visible light region to a near infrared light region. Therefore, when the zoom lens system according to the exemplary embodiment is applied to an image capturing system, wherein an image is captured through an image pickup device by using visible light in daytime, and is captured through the image pickup device by using near infrared light in nighttime, out-of-focus or the like may be suppressed when the day mode is switched into the night mode, or night mode is switched into day mode. Thus, an image of high quality may be captured regardless of whether it is day or night.

When an optical axis direction is the x-axis, and a direction perpendicular to the optical axis direction is the y-axis, an aspheric surface (ASP) according to one or more exemplary embodiments may be defined as follows.

$$x = \frac{cy^2}{1+\sqrt{1-(1+k)c^2y^2}} + Ay^4 + By^6 + Cy^8 + Dy^{10} \quad \text{Equation (1)}$$

Here, x indicates a distance in the optical axis direction from a vertex of a lens, y indicates a distance in a direction perpendicular to the optical axis direction, K is a conic constant, A, B, C, and D are coefficients of aspherical surfaces, and c is an inverse number (1/R) of a radius of curvature at the vertex of the lens.

Tables 1 and 2 below show design data of the zoom lens system shown in FIGS. 1 and 2. In the design data, r denotes a radius of curvature (unit: mm), d denotes a thickness at the center of a lens (unit: mm) or an interval between lenses (unit: mm), nd denotes a refractive power, and vd denotes an Abbe number.

TABLE 1

| surface no. | r | d | nd | vd |
|---|---|---|---|---|
| S1 | 29.188 | 0.85 | 2.001 | 29.13 |
| S2 | 9.600 | 4.02 | | |
| S3 | 23.241 | 0.70 | 1.6516 | 58.52 |
| S4 | 11.100 | 5.68 | | |
| S5 | −20.775 | 0.70 | 1.497 | 81.61 |
| S6 | 17.131 | 6.40 | 1.9229 | 20.88 |
| S7 | 192.529 | 18.64 | | |
| S8 | Infinity | 8.94 | | |
| S9* | 10.404 | 2.11 | 1.5533 | 71.68 |
| S10* | 19.662 | 1.47 | | |
| S11 | 12.938 | 4.35 | 1.497 | 81.61 |
| S12 | −24.308 | 0.20 | | |
| S13 | 13.415 | 0.65 | 1.6645 | 36.01 |
| S14 | 5.432 | 5.07 | 1.437 | 95.1 |
| S15 | −15.906 | 0.65 | 1.8052 | 25.46 |
| S16 | 24.514 | 0.20 | | |
| S17* | 15.829 | 1.36 | 1.92286 | 20.88 |
| S18* | 92.603 | 3.80 | | |
| S19 | Infinity | 1.30 | 1.523 | 58.59 |
| S20 | Infinity | 2.90 | | |
| S21 | Infinity | 0.00 | | |

In Table 1, S8 indicates the surface of an aperture ST, S19 and S20 indicate surfaces of two sides of an optical block G, and S21 indicates a surface of an image plane IP. Also, in the Table 1, * indicates an aspherical surface.

Table 2 shows an aspheric coefficient of the zoom lens system shown in FIGS. 1 and 2. In Table 2, E-m (m: a natural number) indicates X $10^{-m}$.

TABLE 2

| surface no. | K | A | B | C | D |
|---|---|---|---|---|---|
| S9 | −1.2300 | 5.45E−05 | −9.54E−07 | −7.67E−08 | −5.22E−11 |
| S10 | −3.4058 | 1.40E−04 | −6.64E−07 | −1.27E−07 | 8.13E−10 |
| S17 | 0 | 4.07E−04 | −9.97E−06 | 7.86E−07 | −4.24E−08 |
| S18 | 0 | 5.97E−04 | −1.75E−05 | 1.53E−06 | −7.27E−08 |

Table 3 shows a focal length (f, unit: mm) of the zoom lens system, f-number (Fno), a viewing angle (FOV, unit: °), and a variable range (unit: mm) shown in FIGS. 1 and 2, in the wide angle mode and the telephoto mode respectively.

TABLE 3

| | f | Fno | FOV | D7 | D8 | D18 |
|---|---|---|---|---|---|---|
| wide angle mode | 2.93 | 1.25 | 71.81 | 18.64 | 8.94 | 3.8 |
| telephoto mode | 8.55 | 2.34 | 23.28 | 2.43 | 0.75 | 11.99 |

Figure 3:
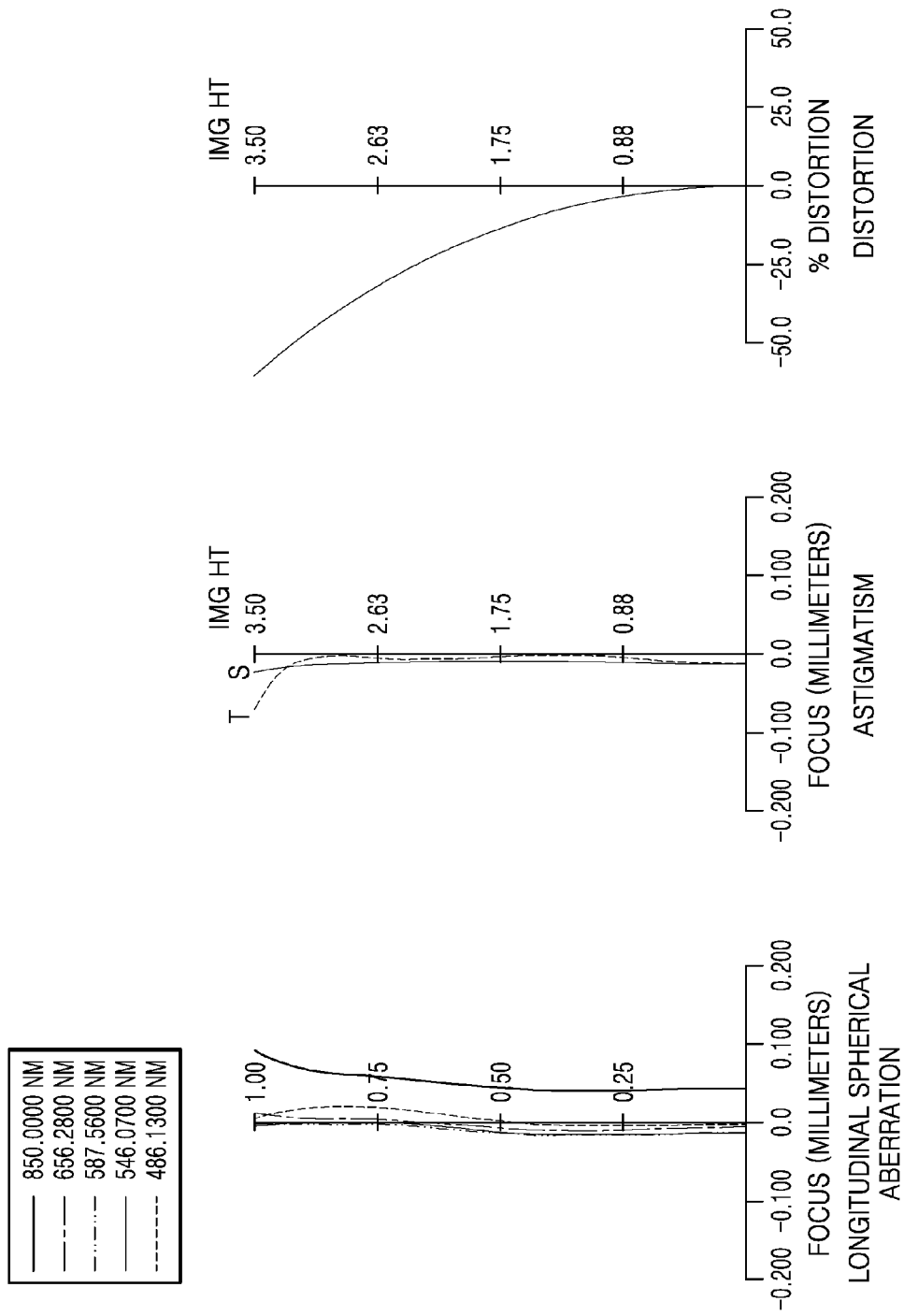
FIG. 3 is a graph of longitudinal spherical aberration, astigmatism, and distortion of the zoom lens system in the wide angle mode of FIG. 1.
Figure 4:
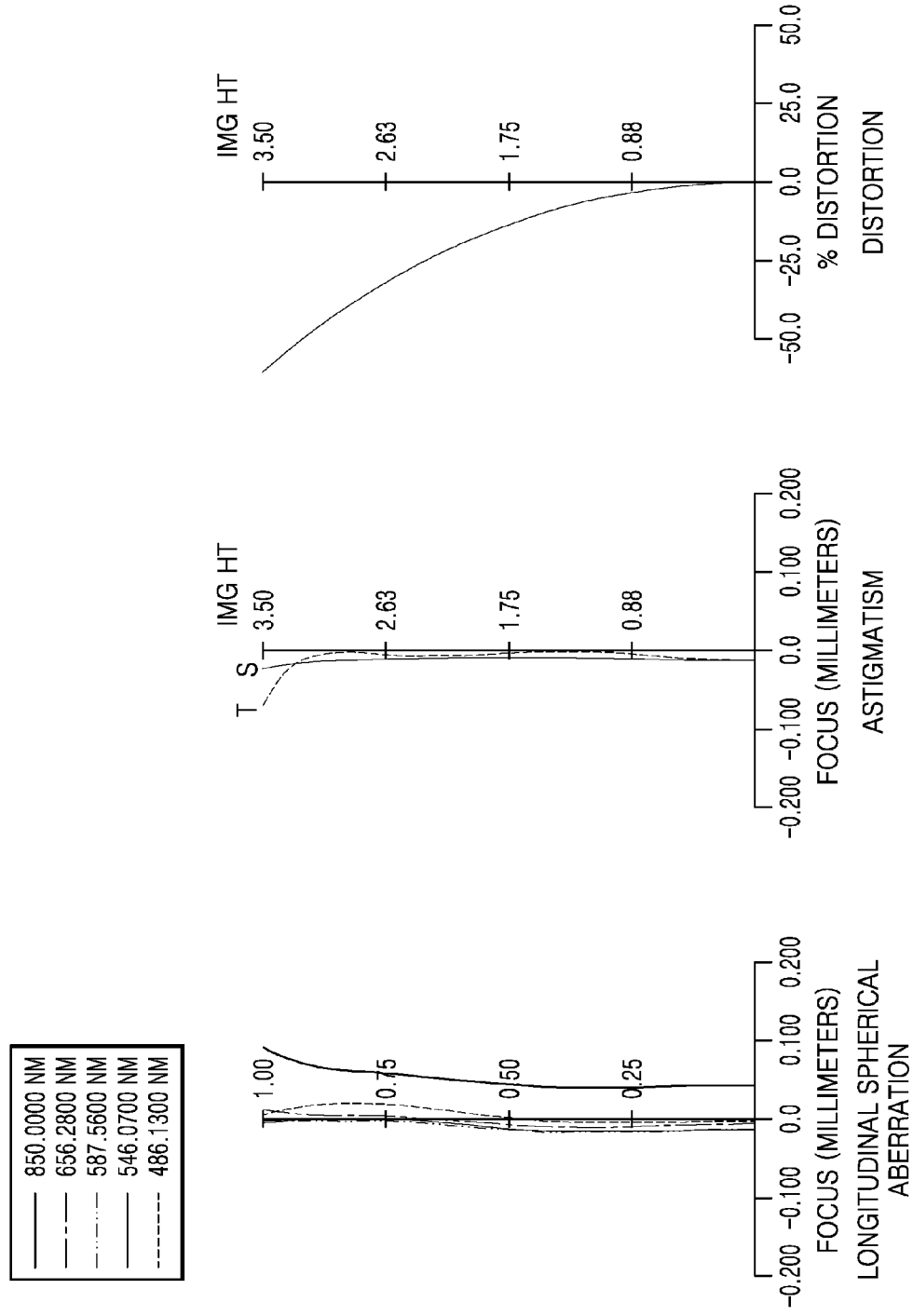
FIG. 4 is a graph of longitudinal spherical aberration, astigmatism, and distortion of the zoom lens system in the telephoto mode of FIG. 2.

FIG. 3 shows a graph of longitudinal spherical aberration, astigmatism, and distortion of the zoom lens system in the wide angle mode of FIG. 1. FIG. 4 is a graph of longitudinal spherical aberration, astigmatism, and distortion of the zoom lens system in the telephoto mode of FIG. 2. The longitudinal spherical aberration is shown with respect to light having wavelengths of about 486.13 nm, about 546.07 nm, about 587.56 nm, about 656.28 nm, and about 850.00 nm, and the astigmatism and the distortion are shown with respect to light having a wavelength of about 546.07 nm. In the astigmatism, a dotted line denotes tangential astigmatism, and a solid line denotes sagittal astigmatism.

Figure 5:
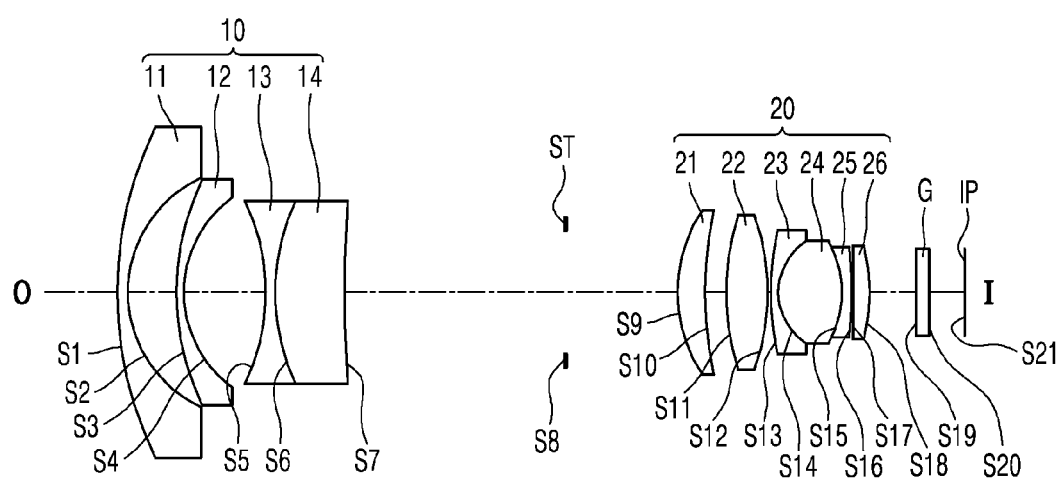
FIG. 5 is a schematic view of a zoom lens system in a wide angle mode according to an exemplary embodiment.
Figure 6:
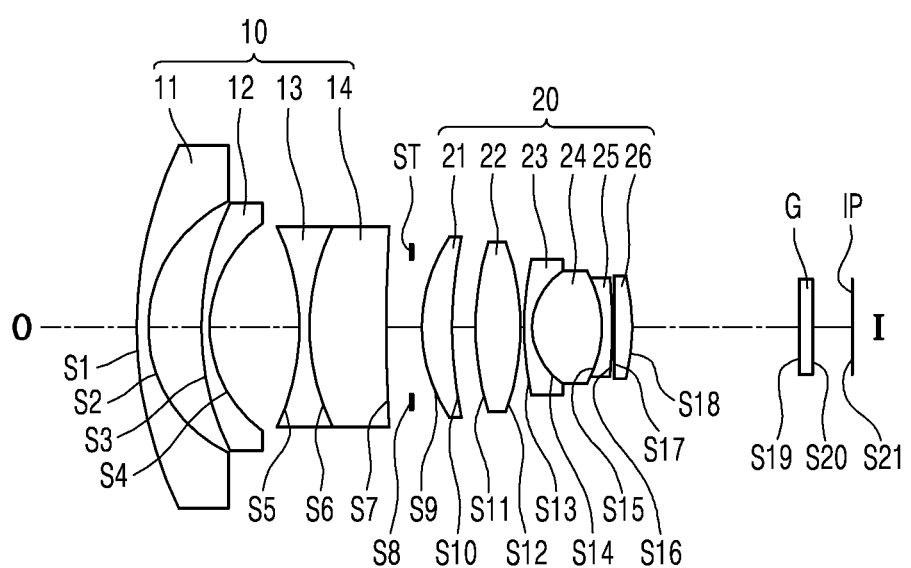
FIG. 6 is a schematic view of a zoom lens system in a telephoto mode, according to an exemplary embodiment.

FIGS. 5 and 6 are schematic views of a zoom lens system according to another exemplary embodiment. FIG. 5 shows a zoom lens system in a wide angle mode, and FIG. 6 shows a zoom lens system in a telephoto mode according to the exemplary embodiment.

Table 4 and 5 below show design data of the zoom lens system shown in FIGS. 5 and 6. In the design data, r denotes a radius of curvature (unit: mm), d denotes a thickness at the center of a lens (unit: mm) or an interval between lenses (unit: mm), nd denotes a refractive power, and vd denotes an Abbe number.

TABLE 4

| surface no. | r | d | nd | vd |
|---|---|---|---|---|
| S1 | 31.196 | 0.90 | 1.9037 | 31.32 |
| S2 | 10.508 | 3.88 | | |
| S3 | 20.564 | 0.70 | 1.618 | 63.4 |
| S4 | 9.844 | 6.68 | | |
| S5 | −19.112 | 0.79 | 1.497 | 81.61 |
| S6 | 17.179 | 5.80 | 1.9229 | 20.88 |
| S7 | 101.122 | 18.25 | | |
| S8 | Infinity | 9.20 | | |
| S9* | 11.929 | 2.26 | 1.7725 | 49.5 |
| S10* | 47.706 | 1.81 | | |
| S11 | 19.771 | 3.41 | 1.497 | 81.61 |
| S12 | −18.038 | 0.20 | | |
| S13 | 22.522 | 0.70 | 1.738 | 32.26 |
| S14 | 5.188 | 5.24 | 1.437 | 95.1 |
| S15 | −7.800 | 0.70 | 1.699 | 30.05 |
| S16 | −66.824 | 0.20 | | |
| S17* | −70.245 | 1.37 | 1.9229 | 20.88 |
| S18* | −16.198 | 3.80 | | |
| S19 | Infinity | 1.00 | 1.523 | 58.59 |
| S20 | Infinity | 3.10 | | |
| S21 | Infinity | 0 | | |

In Table 4, S8 indicates a surface of an aperture ST, S19 and S20 indicate surfaces of two sides of an optical block G, and S21 indicates a surface of an image plane IP. Also, in the Table 4, * indicates an aspherical surface.

Table 5 shows an aspheric coefficient of the zoom lens system shown in FIGS. 5 and 6. In Table 5, E-m (m: a natural number) indicates X $10^{-m}$.

TABLE 5

| surface no. | K | A | B | C | D |
|---|---|---|---|---|---|
| S9 | −0.2846 | 5.43E−05 | −1.54E−06 | 4.60E−08 | −1.00E−09 |
| S10 | 37.1861 | 1.66E−04 | −1.81E−06 | 4.65E−08 | −1.25E−09 |
| S17 | 10 | 1.18E−04 | −4.47E−07 | 6.28E−08 | 7.19E−10 |
| S18 | −10 | −2.48E−04 | −1.33E−07 | 1.71E−07 | −5.22E−09 |

Table 6 shows a focal length (f, unit: mm) of the zoom lens system, f-number (Fno), a viewing angle (FOV, unit: °), and a variable ranges (unit: mm) shown in FIGS. 5 and 6, in the wide angle mode and the telephoto mode, respectively.

TABLE 6

| | f | Fno | FOV | D7 | D8 | D18 |
|---|---|---|---|---|---|---|
| wide angle mode | 2.92 | 1.25 | 72.46 | 18.25 | 9.20 | 3.80 |
| telephoto mode | 8.55 | 2.31 | 23.43 | 1.8 | 0.75 | 12.25 |

Figure 7:
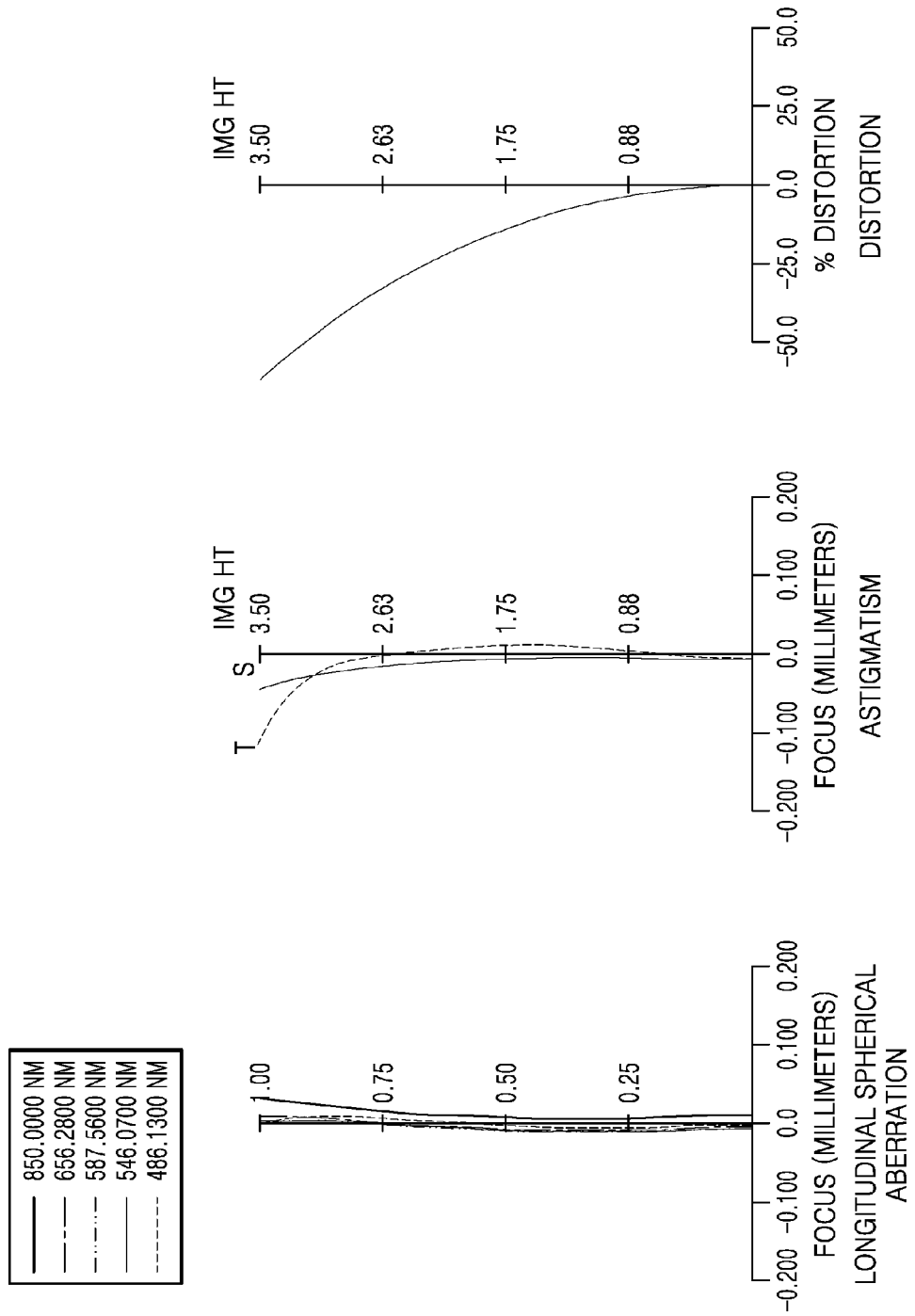
FIG. 7 is a graph of longitudinal spherical aberration, astigmatism, and distortion of the zoom lens system in the wide angle mode of FIG. 5.
Figure 8:
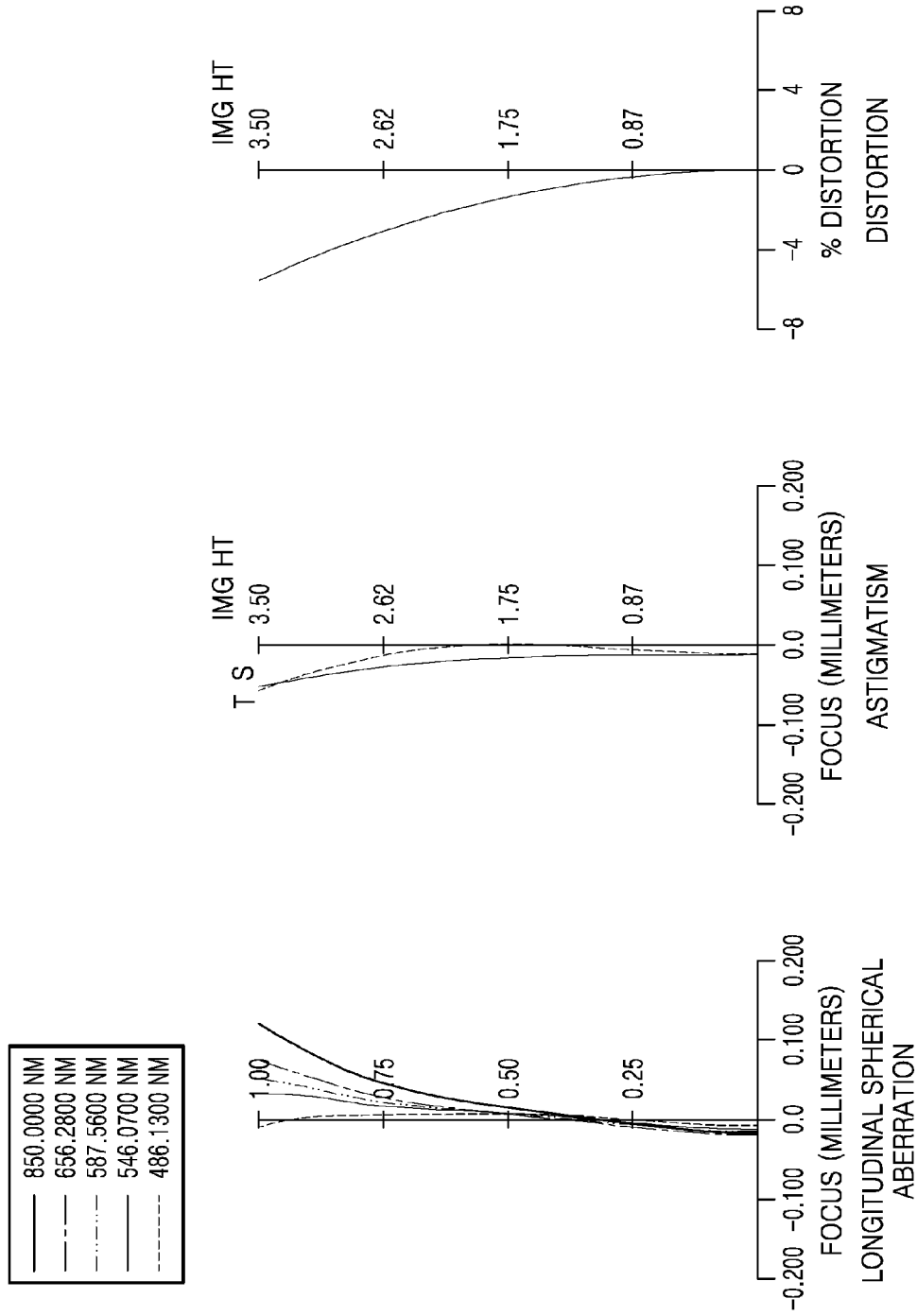
FIG. 8 is a graph of longitudinal spherical aberration, astigmatism, and distortion of the zoom lens system in the telephoto mode of FIG. 6.

FIG. 7 shows a graph of longitudinal spherical aberration, astigmatism, and distortion of the zoom lens system in the wide angle mode of FIG. 5. FIG. 8 is a graph of longitudinal spherical aberration, astigmatism, and distortion of the zoom lens system in the telephoto mode of FIG. 6. The longitudinal spherical aberration is shown with respect to light having wavelengths of about 486.13 nm, about 546.07 nm, about 587.56 nm, about 656.28 nm, and about 850.00 nm, and the astigmatism and the distortion are shown with respect to light having a wavelength of about 546.07 nm. In the astigmatism, a dotted line denotes tangential astigmatism, and a solid line denotes sagittal astigmatism.

As described above, according to the exemplary embodiments, the zoom lens systems which satisfactorily compensate for aberrations, may be realized. However, the above-described zoom lens systems do not restrict the inventive concepts.

It should be understood that the exemplary embodiments described therein should be considered in a descriptive sense only and not for purposes of limitation. Descriptions of features or aspects within each embodiment should typically be considered as available for other similar features or aspects in other exemplary embodiments.

While exemplary embodiments have been particularly shown and described above, it will be understood by those of ordinary skill in the art that various changes in form and details may be made therein without departing from the spirit and scope of the inventive concept as defined by the following claims.

What is claimed is:

1. A zoom lens system, in an order from an object to an image, comprising:
   a first lens group having a negative refractive power;
   an aperture; and
   a second lens group having a positive refractive power,
   wherein the first lens group comprises a first lens, a second lens, a third lens and a fourth lens in the order from the object to the image,
   wherein an Abbe number of the first lens is less than 30,
   wherein an Abbe number of the second lens is greater than 45 and less than 65, and
   wherein a ratio of an Abbe number of the third lens to an Abbe number of the fourth lens is greater than 3.8 and less than 4.3.

2. The zoom lens system of claim 1, wherein the zoom lens system is configured to perform zooming by moving the second lens group in an optical axis direction.

3. The zoom lens system of claim 1, wherein the zoom lens system is configured to perform focusing by moving the first lens group in an optical axis direction.

4. The zoom lens system of claim 1, wherein each of the first, second and third lenses has a negative refractive power, the fourth lens has a positive refractive power, and the third and fourth lenses are cemented to each other.

5. The zoom lens system of claim 1, wherein the second lens group comprises a fifth lens, a sixth lens, a seventh lens, an eighth lens, a ninth lens and a tenth lens in the order from the object to the image, and
   wherein an Abbe number of the fifth lens is greater than 63, and an Abbe number of the tenth lens is less than 25.

6. The zoom lens system of claim 5, wherein each of the fifth lens, the sixth lens, the eighth lens, and the tenth lens has a positive refractive power, and each of the seventh lens and the ninth lens has a negative refractive power.

7. The zoom lens system of claim 6, wherein the fifth lens comprises at least one aspheric surface.

8. The zoom lens system of claim 7, wherein the fifth lens comprises two aspheric surfaces.

9. The zoom lens system of claim 6, wherein the tenth lens comprises at least one aspheric surface.

10. The zoom lens system of claim 9, wherein the tenth lens comprises two aspheric surfaces.

11. The zoom lens system of claim 6, wherein the tenth lens has a meniscus shape.

12. An image capturing system comprising:
    an image pickup device configured to capture an image; and
    the zoom lens system of claim 1.

* * * * *